(12) United States Patent
Costa et al.

(10) Patent No.: US 12,172,795 B2
(45) Date of Patent: Dec. 24, 2024

(54) UNIT AND METHOD FOR FORMING A TUBE FOR PRODUCING SEALED PACKAGES STARTING FROM A SHEET OF PACKAGING MATERIAL

(71) Applicant: TETRA LAVAL HOLDINGS & FINANCE S.A., Pully (CH)

(72) Inventors: Stefano Costa, Casalmaggiore (IT); Gianfranco Caltabiano, Modena (IT); Roberto Borsari, Modena (IT); Gianni Morselli, Bomporto (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 164 days.

(21) Appl. No.: 17/801,610

(22) PCT Filed: Feb. 26, 2021

(86) PCT No.: PCT/EP2021/054782
§ 371 (c)(1),
(2) Date: Aug. 23, 2022

(87) PCT Pub. No.: WO2021/175707
PCT Pub. Date: Sep. 10, 2021

(65) Prior Publication Data
US 2023/0072010 A1    Mar. 9, 2023

(30) Foreign Application Priority Data

Mar. 3, 2020  (EP) ..................................... 20160530

(51) Int. Cl.
*B65B 9/22*    (2006.01)
*B29C 53/38*   (2006.01)
(Continued)

(52) U.S. Cl.
CPC .............. *B65B 9/22* (2013.01); *B29C 53/382* (2013.01); *B29C 53/52* (2013.01); *B65B 9/2028* (2013.01);
(Continued)

(58) Field of Classification Search
CPC ......... B29C 53/382; B29C 53/52; B65B 9/22; B65B 9/2028; B65B 55/103; B65B 51/144; B65B 61/24
See application file for complete search history.

(56) References Cited

U.S. PATENT DOCUMENTS

2011/0120063 A1\* 5/2011 Turesson .............. B65B 9/2035
53/551

FOREIGN PATENT DOCUMENTS

EP      2578505 A1    4/2013
WO  2009070077 A1    6/2009

OTHER PUBLICATIONS

International Search Report (PCT/ISA/210) and Written Opinion (PCT/ISA/237) mailed on May 20, 2021, by the European Patent Office as the International Searching Authority for International Application No. PCT/EP2021/054782.

\* cited by examiner

*Primary Examiner* — Thomas M Wittenschlaeger
(74) *Attorney, Agent, or Firm* — BUCHANAN INGERSOLL & ROONEY PC (57) ABSTRACT

A unit configured to form a tube for producing sealed packages starting from a sheet of packaging material having opening devices pre-applied thereon, comprises at least one guiding assembly configured to interact with the sheet of packaging material to fold it gradually into a tube shape; the guiding assembly comprises a plurality of folding rollers delimiting a passage for the sheet of packaging material and each having a lateral wall configured to cooperate in contact
(Continued)

with the sheet of packaging material to control the folding thereof; the folding rollers comprise at least one folding roller having at least one recess on the lateral wall thereof, the recess defining a slot configured to be engaged by the opening devices.

20 Claims, 4 Drawing Sheets

(51) Int. Cl.
*B29C 53/52* (2006.01)
*B65B 9/20* (2012.01)
*B65B 51/14* (2006.01)
*B65B 55/10* (2006.01)
*B65B 61/18* (2006.01)
*B65B 61/24* (2006.01)
*B29L 31/00* (2006.01)

(52) U.S. Cl.
CPC .......... *B65B 51/144* (2013.01); *B65B 55/103* (2013.01); *B65B 61/186* (2013.01); *B65B 61/24* (2013.01); *B29L 2031/7166* (2013.01)

UNIT AND METHOD FOR FORMING A TUBE FOR PRODUCING SEALED PACKAGES STARTING FROM A SHEET OF PACKAGING MATERIAL

TECHNICAL FIELD

The present invention relates to a unit configured to form a tube for producing sealed packages, preferably packages containing a pourable product, in particular a pourable food product, starting from a sheet of packaging material with pre-applied opening devices, in particular a sheet of packaging material having opening devices pre-moulded thereon.

The present invention further relates to a method for forming a tube for producing sealed packages, preferably packages containing a pourable product, in particular a pourable food product, starting from a sheet of packaging material with pre-applied opening devices, in particular a sheet of packaging material having opening devices pre-moulded thereon.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated web of packaging material. The packaging material has a multilayer structure comprising a base layer, e.g. made of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Such packages are normally produced in fully automatic packaging assemblies, in which a continuous tube is formed from a web of packaging material unwound from a reel and fed to such packaging assembly. The web of packaging material is sterilized in the packaging assembly, e.g. by applying a chemical sterilizing agent, such as hydrogen peroxide solution, which, once sterilization is completed, is removed from the surfaces of the packaging material, e.g. evaporated by heating. The web so sterilized is then maintained in a closed, sterile environment, and is folded and sealed longitudinally to form the tube, which is fed along a vertical advancing direction.

In order to complete the forming operations, the tube is filled with the sterilized food product from above and is sealed and subsequently cut along equally spaced transversal cross-sections by a known forming and sealing unit.

Pillow packs are obtained thereby, which have a longitudinal sealing band, a top transversal sealing band and a bottom transversal sealing band.

The known packaging assemblies typically comprise a folding unit configured to be fed with the pillow packs to form fully-folded finished packages.

In order to form the tube, the web of packaging material is fed through a number of guiding assemblies which interact with the packaging material to fold it gradually from a sheet form into a tube shape.

The guiding assemblies are arranged in succession and comprise respective folding members defining a number of compulsory passages for the packaging material varying gradually in section from a C shape to a substantially circular shape.

In particular, each guiding assembly comprises a plurality of folding rollers defining the folding members and rotating around rotation axes arranged in a common plane, typically a horizontal plane.

When interacting with the folding rollers, a first longitudinal edge of the sheet of packaging material is gradually brought closer and closer and then superimposed to a second longitudinal edge of the sheet of packaging material opposite the first longitudinal edge, until one of the two longitudinal edges overlaps the other in the radial direction, with respect to the tube axis.

Then, the first longitudinal edge and the second longitudinal edge are sealed together, for example heat-sealed, so as to form a longitudinal sealing band along the tube, i.e. substantially parallel to the tube axis.

At this point, the tube can be filled with the pourable product and then formed, sealed transversally and cut to obtain the aforementioned pillow packs.

To open the packages described above, various solutions have been proposed, which involve the use of opening devices made of plastic material.

According to a first solution, opening devices are known to be molded, for example by injection molding, directly on a so-called prelaminated hole, i.e. a hole formed through the base layer only and covered, by means of a lamination process, by the other lamination layers of the packaging material, including the layer of gas-barrier material.

In other words, the molten plastic material is moulded, in particular injection moulded onto, and through, a cover portion of the prelaminated hole made of such lamination layers.

According to an alternative solution, such cover portion may be defined by a patch attached to the packaging material to close a hole formed, in this case, through the full thickness of the packaging material.

According to an alternative solution, holes are formed, in particular punched, through the full thickness of the packaging material and, subsequently, opening devices are moulded thereon.

Therefore, in the above solutions, the sheet of packaging material is already provided with opening devices pre-applied thereon, before its compulsory passage through the guiding assemblies.

During the forming of the tube starting from a sheet of packaging material with pre-applied opening devices, the opening devices could interfere and collide with one of the folding rollers, in particular with the folding roller being in the trajectory of the opening devices.

A known solution is to remove such folding roller, thereby freeing the passage for the opening devices through the guiding assemblies.

However, for some type of packages, for example for the packages of small size, such as single-serving size packages, the above-mentioned solution has some drawbacks.

In fact, when the first longitudinal edge is superimposed to the second longitudinal edge an overlapping area is defined. It is extremely important to control the extension, i.e. the width, of the overlapping area in order to guarantee a good longitudinal sealing of the tube and a correct weight of the packages being formed.

The Applicant has observed that if ratio between the diameter of the tube and opening device size ratio is very small, removing one of the folding rollers could compromise the optimal overlap between the first longitudinal edge and the second longitudinal edge of the sheet of packaging material.

In practice, the removal of one folding roller could cause a bulging of the tube in the radial direction, in the area of the removed folding roller.

In addition, since the operations of forming the tube and longitudinally sealing the tube are carried out continuously, it is extremely important that the extension of the overlapping area is kept as constant as possible during a working cycle of the packaging assembly.

DISCLOSURE OF INVENTION

It is therefore an object of the present invention to provide a unit configured to form a tube for producing sealed packages starting from a sheet of packaging material having opening devices pre-applied thereon, which is designed to overcome at least one of the above-mentioned drawbacks in a straightforward and low-cost manner.

This object is achieved by a unit as claimed in claim 1.

It is a further object of the present invention to provide a method for forming a tube for producing sealed packages starting from a sheet of packaging material having opening devices pre-applied thereon, which allows to overcome at least one of the above-mentioned drawbacks in a straightforward and low-cost manner.

This object is achieved by a method as claimed in claim 11.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
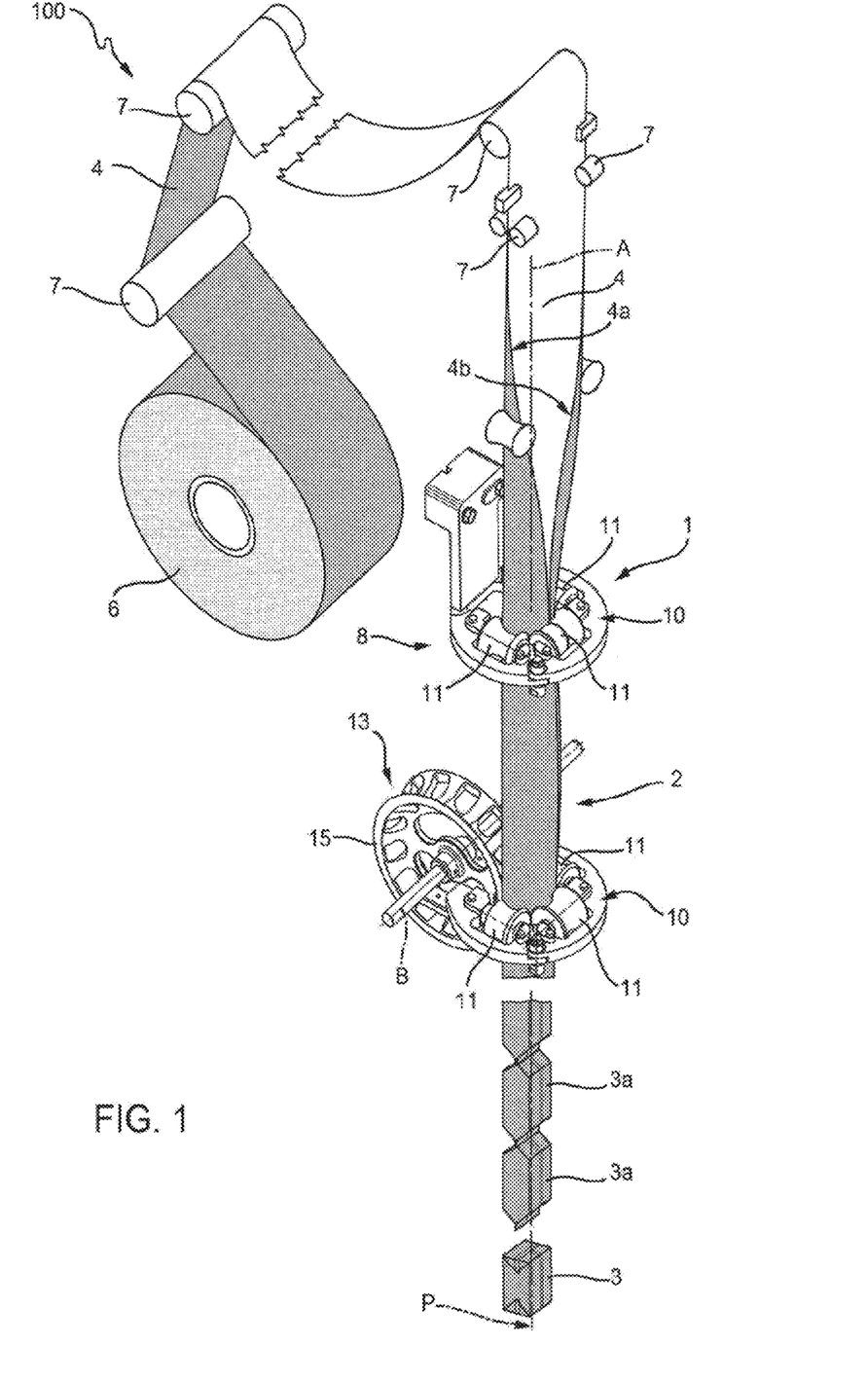
FIG. 1 is a perspective view, with parts removed for clarity, of a packaging assembly for producing sealed packages and comprising a unit configured to form a tube for producing such packages starting from a sheet of packaging material according to the present invention.

With reference to FIG. 1, number 1 indicates as a whole a unit configured to form a tube 2 for producing sealed packages 3, preferably packages 3 containing a pourable product, in particular a pourable food product such as pasteurized or UHT milk, fruit juice, wine, peas, beans, etc., starting from a web-like sheet 4 of packaging material with pre-applied opening devices 5, in particular a sheet 4 of packaging material having opening devices 5 pre-moulded thereon.

Unit 1 is part of a known packaging assembly 100 for continuously producing packages 3 from sheet 4 of packaging material, which is unwound off a reel 6 and fed along a forming path P.

The packaging material has a multilayer structure (not shown), and comprises a layer of fibrous material, e.g. paper, covered on both sides with respective layers of heat-seal plastic material, e.g. polyethylene.

In the case of aseptic packages 3 for long-storage products, such as UHT milk, the packaging material also comprises a layer of gas-and-light barrier material, e.g. aluminum foil or ethylene vinyl alcohol (EVOH) film, which is superimposed on a layer of heat-seal plastic material, and is in turn covered with another layer of heat-seal plastic material, the latter forming the inner face of the package 3 eventually contacting the pourable product.

Figure 2:
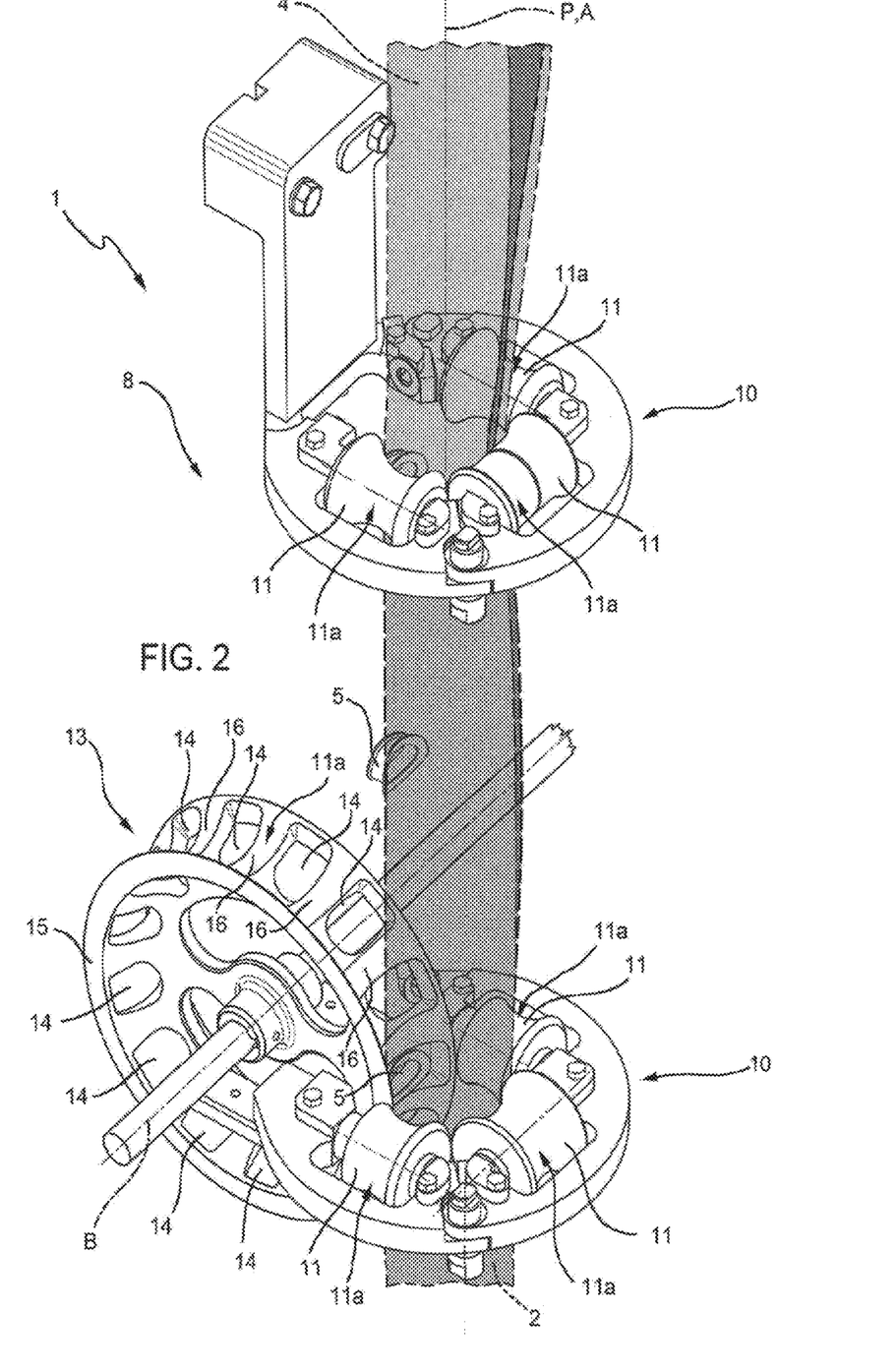
FIG. 2 is a larger-scale perspective view, with parts removed for clarity, of the unit of FIG. 1.
Figure 3:
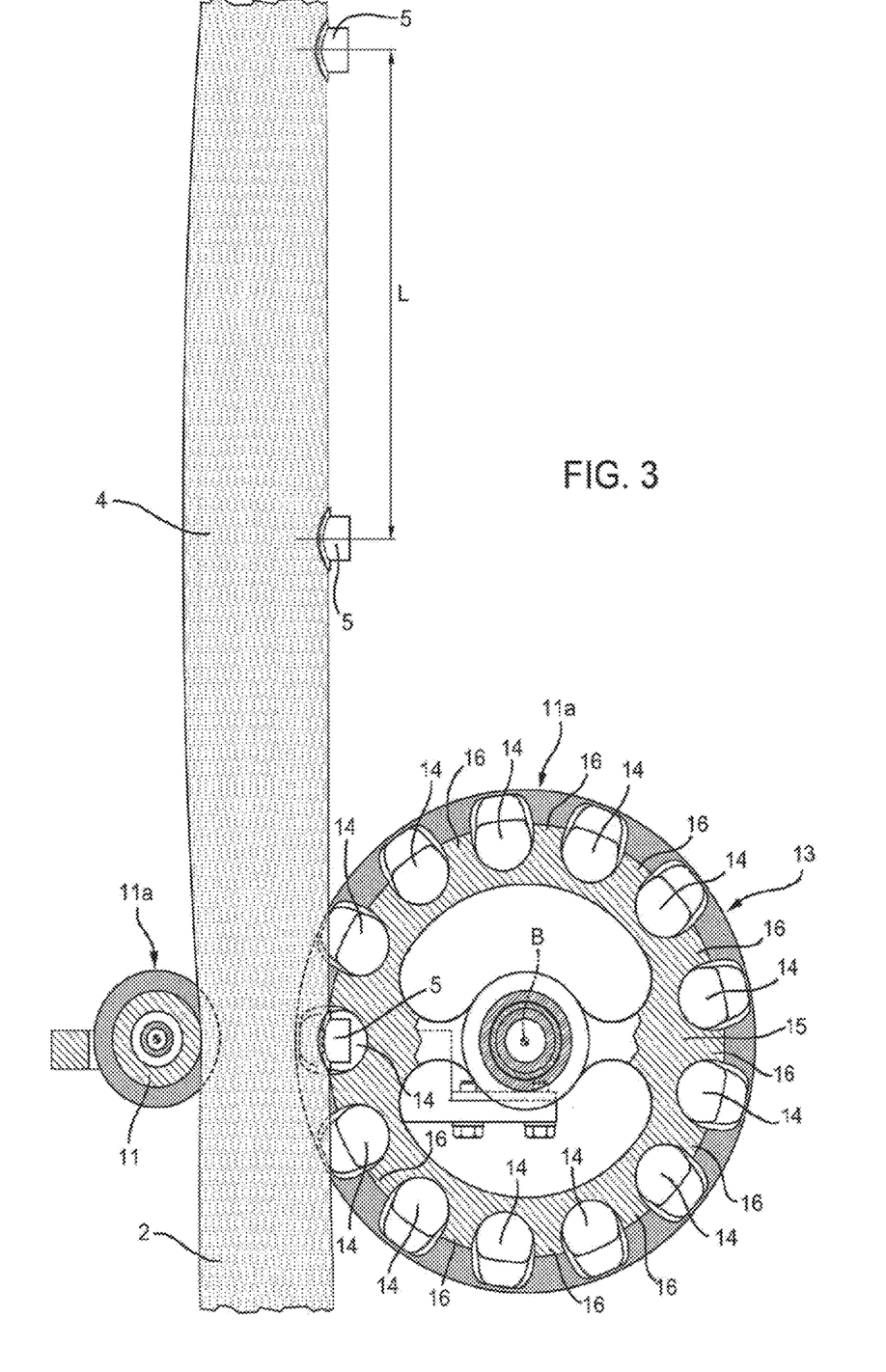
FIG. 3 is a partially sectioned side view, with parts removed for clarity, of the unit of FIG. 2.
Figure 4:
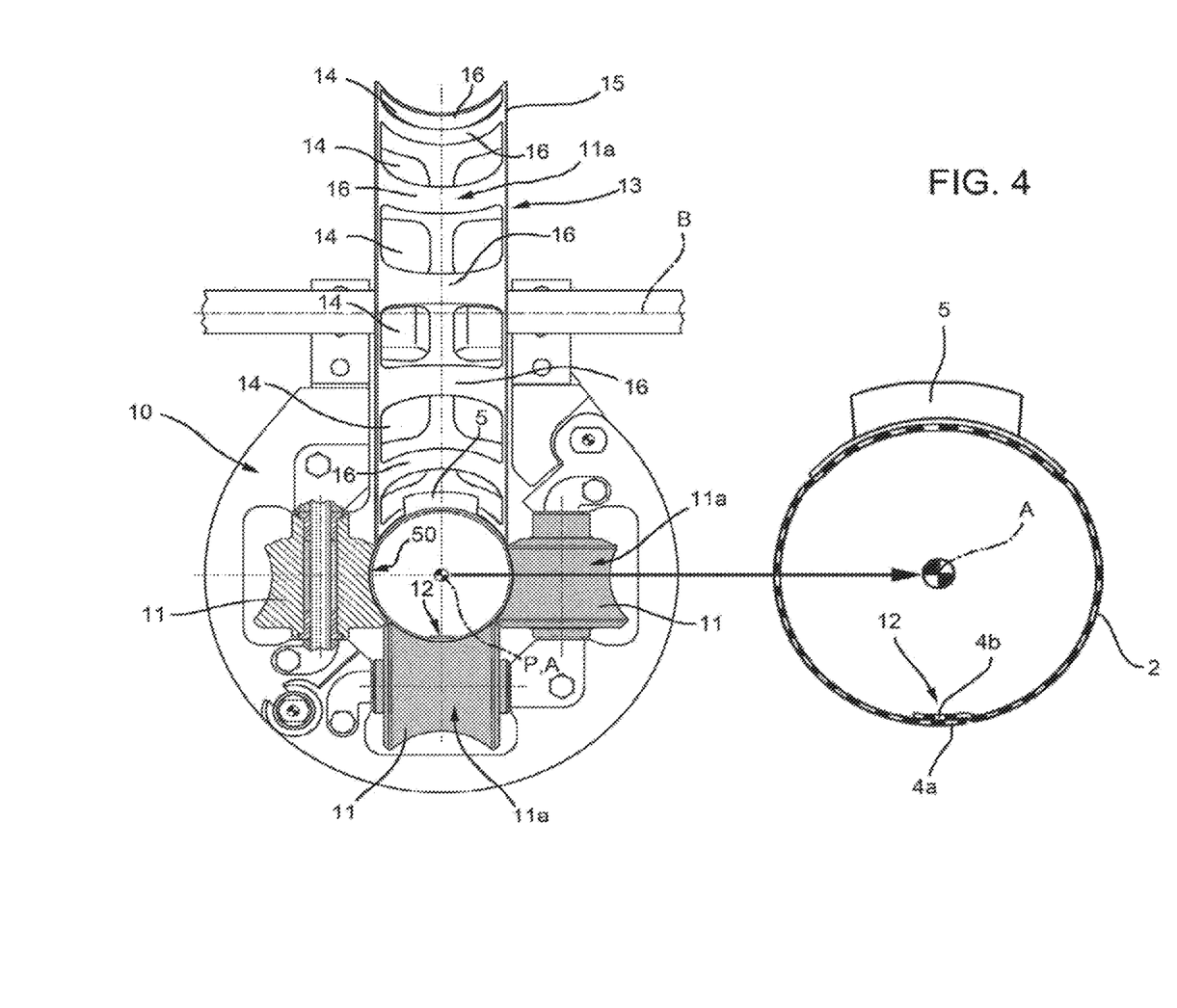
FIG. 4 is a partially sectioned top view, with parts removed for clarity, of the unit of FIG. 2.

After being unwound off reel 6 and before entering the unit 1, sheet 4 of packaging material is sterilized, e.g. by applying a chemical sterilizing agent, such as hydrogen peroxide solution, which, once sterilization is completed, is removed from the surfaces of the packaging material, e.g. evaporated by heating, and is provided with a plurality of opening devices 5 (FIGS. 2, 3 and 4).

According to this non-limiting embodiment, opening devices 5 are made of plastic material which is injection-molded onto sheet 4 of packaging material by means of known molding devices (not shown) arranged downstream of reel 6 and upstream of unit 1, along forming path P.

In particular, opening devices 5 are molded onto sheet 4 of packaging material along a substantially straight application band and at substantially the same distance L, in particular the same rectilinear distance L, from one another.

It is hereby stated that the term "substantially" is used in the present description to take into account the normal tolerances which may be present among the components of unit 1 and packaging assembly 100.

As visible in FIG. 1, sheet 4 of packaging material is fed along the forming path P by guide members 7, e.g. rollers or similar.

Packaging assembly 100 further comprises known forming and sealing means, for example a jaw-type unit (not shown) arranged downstream of unit 1 and configured to grip, to form, to transversally seal and to cut tube 2 along equally spaced cross-sections, in order to obtain pillow packs 3a.

Such pillow packs 3a are then fed to a folding unit (not shown) configured to fold them into finished packages 3.

Unit 1 comprises a folding assembly 8 for progressively folding sheet 4 of packaging material.

Folding assembly 8 comprises a plurality of guiding assemblies 10, two in the preferred embodiment shown, arranged successively along forming path P and configured to interact with sheet 4 of packaging material to fold it gradually into a tube shape, thereby obtaining tube 2.

In particular, each guiding assembly 10 comprises a plurality of folding rollers 11 rotatably mounted on the relative guiding assembly 10 around a respective rotation axis, delimiting a passage 50 (FIG. 4) for sheet 4 of packaging material, i.e. for the tube 2 being formed, and configured to interact with sheet 4 of packaging material.

In detail, each folding roller 11 has a lateral wall 11a configured to cooperate in contact with sheet 4 of packaging material to control the folding thereof.

In greater detail, while sheet 4 of packaging material is pulled, in use, through passage 50 by the action of the jaw-type unit, lateral walls 11a of folding rollers 11 interact with sheet 4 of packaging material, so as to form sheet 4 of packaging material into tube 2.

More precisely and according to a manner known and not described in detail, folding rollers 11 are configured to cooperate in contact with sheet 4 of packaging material to cause a first longitudinal edge 4a thereof to superimpose on a second longitudinal edge 4b thereof, opposite to the first longitudinal edge 4a, so as to define an overlapping area 12 of the first longitudinal edge 4a and the second longitudinal edge 4b.

In other words, the folding rollers 11 form tube 2 in such a way that first longitudinal edge 4a is located outwards of second longitudinal edge 4b with respect to an axis A of tube 2 (FIG. 4).

Unit 1 further comprises a sealing station (not shown) including sealing means, preferably heating means, configured for heating first longitudinal edge 4a and locally melting the polyethylene layer of first longitudinal edge 4a.

The heat is transmitted by conduction from the first longitudinal edge 4a to the second longitudinal edge 4b, so as to locally melt the polyethylene layer of the second longitudinal edge 4b.

The first longitudinal edge 4a and the second longitudinal edge 4b are then pressed together to obtain a longitudinal seal substantially parallel to axis A.

At this point, tube 2 can be filled, preferably from above, with the pourable product.

As visible in the attached figures, passage 50 defined by folding rollers 11 is coaxial to axis A.

Preferably, the rotation axes of folding rollers 11 of one guiding assembly 10 are arranged on a respective common plane.

In particular, the two guiding assemblies 10 are arranged on different planes successively arranged along forming path P.

In the embodiment shown, such planes are horizontal and parallel to one another and axis A is vertical.

Thus, in use, sheet 4 of packaging material interacts first with the upper guiding assembly 10, which causes first longitudinal edge 4a to approach second longitudinal edge 4b, thereby folding sheet 4 of packaging material in a substantially C-shape.

Then, the folded sheet 4 of packaging material interacts with the lower guiding assembly 10, which determines the creation of overlapping area 12 and causes the C-shaped sheet 4 of packaging material to be folded into a tube-shape.

In light of the above, folding rollers 11 surround sheet 4 of packaging material during the folding thereof, and therefore during the formation of tube 2.

Since sheet 4 of packaging material is provided with opening devices 5 pre-applied thereon along the application band, such opening devices 5 could collide with one of the folding rollers 11 which surround sheet 4 of packaging material and define passage 50.

One solution to this problem entails the removal of the folding roller 11 which lies in the trajectory of opening devices 5 through passage 50.

However, as stated above, the Applicant has observed that in case of small-sized packages 3, i.e. in case of a tube 2 of small diameter, such removal could compromise the optimal overlap of first longitudinal edge 4a on second longitudinal edge 4b at overlapping area 12.

Advantageously, folding rollers 11 comprise at least one folding roller 13 having at least one recess on the lateral wall 11a thereof, the recess defining a slot 14 configured to be engaged by the opening devices 5.

Preferably, folding roller 13 has a plurality of slots 14 on the lateral wall 11a thereof, so as to define an alternation of solids and voids on said lateral wall 11a, each void being defined by one respective slot 14.

In detail, folding roller 13 defines a toothed wheel 15 comprising a plurality of teeth 16 defining the above-mentioned solids.

Furthermore, teeth 16 are configured to selectively mesh with opening devices 5, so as to drive wheel 15 in rotation by the movement of sheet 4 of packaging material through passage 50.

In light of the above, sheet 4 of packaging material drives, i.e. puts in rotation, wheel 15, i.e. folding roller 13, by means of the opening devices 5 engaging respective slots 14 and meshing with respective teeth 16.

More specifically, opening devices 5 mesh with respective side portions of teeth 16, as shown in particular in FIG. 3.

Furthermore, teeth 16, in particular upper surfaces of teeth 16, define respective portions of lateral wall 11a of folding roller 13 configured to cooperate in contact with sheet 4 of packaging material, as shown in particular in FIGS. 2 and 3.

Preferably, folding roller 13 is rotatable around a rotation axis B arranged on the same common plane of the rotation axes of the other folding rollers 11 of the same guiding assembly 10, i.e. the lower guiding assembly 10.

In particular, axis B is orthogonal to axis A.

Thanks to the presence of folding roller 13, i.e. wheel 15, an optimal overlap of first longitudinal edge 4a on second longitudinal edge 4b at overlapping area 12 can be achieved, since the alternation of solids and voids, i.e. of teeth 16 and slots 14, provides for a radial support of sheet 4 of packaging material and, at the same time, for the free passing of opening devices 5 through passage 50.

In other words, teeth 16 avoid a bulging, i.e. a displacement in the radial direction relative to axis A, of sheet 4 of packaging material, i.e. of the tube 2 being formed, which bulging could compromise the optimal overlap obtained at the overlapping area 12.

At the same time, each slot 14 provides a space for the opening devices 5 pre-applied onto sheet 4 of packaging material to pass freely through passage 50, thereby avoiding any collision in the radial direction.

According to the preferred embodiment shown, only one of the guiding assemblies 10, in particular the lower guiding assembly 10, is provided with one folding roller 13.

Accordingly, the upper guiding assembly 10 is devoid of one folding roller 11 so that opening devices 5 can pass freely through the relative passage 50.

As mentioned above, opening devices 5 push onto respective teeth 16, putting wheel 15 in rotation.

Hence, advantageously, folding roller 13, i.e. wheel 15, is an idle roller, namely it is passively driven in rotation.

Moreover, the above-described configuration provides for a self-synchronizing meshing. In fact, in case folding roller 13 accumulates a certain amount of delay with respect to the nominal meshing between teeth 16 and opening devices 5, the opening devices 5 themselves will act on the respective teeth 16, in particular on the aforementioned side portions of teeth 16, thereby ensuring the self-synchronization.

In order to ensure the least possible delay between the slots 14 and the opening devices 5 and, therefore, the fastest delay recovery, it is convenient to provide folding roller 13 with a large number of slots 14.

Conveniently, a distance between two successive slots 14 or between two successive teeth 16, measured on the external perimeter of the lateral wall 11a of folding roller 13 is equal to the distance L divided by an integer number.

It is specified herein that the aforementioned distance is a curved distance measured on the external perimeter of folding roller 13, i.e. the distance is defined by an arc of circumference.

Accordingly, folding roller 13 comprises an arbitrary number of slots 14 and teeth 16, provided that a distance between two successive slots 14 or between two successive teeth 16, measured on the external perimeter of the lateral wall 11a of folding roller 13, is equal to the distance L divided by an integer number.

According to a non-shown embodiment, unit 1 could comprise an actuation device (not shown), such as a motor, operatively coupled to folding roller 13 and configured to selectively control a rotation of folding roller 13 around axis B. For example, the actuation device could control a rotation of folding roller 13 to recover a delay in the meshing between teeth 16 and opening devices 5.

Preferably, slots 14 are equally spaced from one another along lateral wall 11a. Hence, also teeth 16 are equally spaced from one another along lateral wall 11a.

Therefore, the above-mentioned solids and voids alternate one another at a regular pace.

The operation of unit 1 is described hereinafter starting from a condition in which sheet 4 of packaging material has already interacted with the upper guiding assembly 10 and is advancing towards the lower guiding assembly 10 at which folding roller 13 is located.

At this point, sheet 4 of packaging material interacts with folding rollers 11 of the lower guiding assembly 10 and with folding roller 13, advancing through passage 50.

Accordingly, opening devices 5 sequentially engage respective slots 14 of folding roller 13 and mesh with teeth 16 thereof, thereby driving folding roller 13, i.e. wheel 15 and putting it in rotation around axis B.

In this way, the overlap of first longitudinal edge 4a and of second longitudinal edge 4b is obtained and maintained at overlapping area 12, while opening devices 5 can pass freely through passage 50, without being hindered therethrough.

Tube 2 is thereby formed, sealed longitudinally and filled from above with the pourable product, in a manner known and not described in detail.

Tube 2 is then fed to the jaw-type unit arranged downstream of unit 1 to be formed, transversally sealed and cut along equally spaced cross-sections, in order to obtain pillow packs 3a.

Such pillow packs 3a are then fed to the folding unit configured to fold them into finished packages 3.

The above operation is carried out continuously throughout the working cycle of packaging assembly 100.

The advantages of unit 1 according to the present invention will be clear from the foregoing description.

In particular, thanks to the configuration of folding roller 13, i.e. wheel 15, an optimal overlap of first longitudinal edge 4a on second longitudinal edge 4b at overlapping area 12 can be achieved, since the alternation of solids and voids, i.e. of teeth 16 and slots 14, provides for a radial support of sheet 4 of packaging material and, at the same time, for the free passing of opening devices 5 through passage 50.

In other words, teeth 16 avoid a bulging, i.e. a displacement in the radial direction relative to axis A, of sheet 4 of packaging material, i.e. of tube 2 being formed, thereby ensuring that the extension of overlapping area 12 is kept as constant as possible during the working cycle of packaging assembly 100.

Therefore, a unit 1 for the optimal production of small-size packages 3 starting from a sheet 4 of packaging material with pre-applied opening devices 5 is provided.

Clearly, changes may be made to unit 1 as described herein without, however, departing from the scope of protection as defined in the accompanying claims.

The invention claimed is:

1. A unit configured to form a tube for producing sealed packages starting from a sheet of packaging material having opening devices pre-applied thereon, the unit comprising:

at least one guiding assembly configured to interact with the sheet of packaging material to fold it gradually into a tube shape;

the guiding assembly comprising a plurality of folding rollers delimiting a passage for the sheet of packaging material and each having a lateral wall configured to cooperate in contact with the sheet of packaging material to control the folding thereof;

said folding rollers comprising at least one folding roller having at least one recess on the lateral wall thereof, the recess defining a slot configured to be engaged by said opening devices; and said at least one folding roller having a plurality of said slots on the lateral wall thereof so as to define an alternation of solids and voids on said lateral wall.

2. The unit as claimed in claim 1, wherein said slots are equally spaced from one another along said lateral wall.

3. The unit as claimed in claim 1, wherein said at least one folding roller defines a toothed wheel comprising a plurality of teeth defining said solids and configured to selectively mesh with the opening devices.

4. The unit as claimed in claim 3, wherein the teeth define portions of the lateral wall of said at least one folding roller configured to cooperate in contact with the sheet of packaging material.

5. The unit as claimed in claim 1, wherein a distance between two successive slots or between two successive solids, measured on the external perimeter of the lateral wall of said at least one folding roller is equal to the distance between two consecutive opening devices on said sheet of packaging material divided by an integer number.

6. The unit as claimed in claim 1, wherein the at least one folding roller is a first folding roller that is rotatable about a first rotation axis, the plurality of folding rollers also including a plurality of second folding rollers each rotatable around a respective second rotation axis, the first rotation axis and the second rotation axis of each second folding roller being arranged in a common plane.

7. The unit as claimed in claim 1, and further comprising an actuation device operatively coupled to said at least one folding roller and configured to selectively control a rotation of said at least one folding roller about its own rotation axis.

8. The unit as claimed in claim 1, wherein the passage has a longitudinal axis; said at least one folding roller having a rotation axis orthogonal to said longitudinal axis.

9. The unit as claimed in claim 1, wherein the folding rollers are configured to cooperate in contact with the sheet of packaging material to cause a first longitudinal edge thereof to superimpose on a second longitudinal edge thereof, opposite to the first longitudinal edge, so as to define an overlapping area of the first longitudinal edge and the second longitudinal edge.

10. A method for forming a tube for producing sealed packages starting from a sheet of packaging material having opening devices pre-applied thereon, the method comprising:

a) advancing the sheet of packaging material through a guiding passage;

b) providing a plurality of folding rollers delimiting said passage and having respective lateral walls, wherein the folding rollers comprise at least one folding roller having at least one recess on the lateral wall thereof, the at least one recess defining a plurality of slots on the lateral wall thereof;

c) cooperating in contact with the sheet of packaging material by means of said lateral walls so as to fold the sheet gradually into a tube shape; and d) engaging said slots of said at least one folding roller with the opening devices to mesh the opening devices into the slots.

11. The method as claimed in claim 10, and further comprising: f) driving said at least one folding roller in rotation by performing the step a) of advancing and by means of the step e) of meshing.

12. The method as claimed in claim 10, and further comprising: g) driving said at least one folding roller in rotation about a rotation axis thereof by means of an actuation device.

13. A unit configured to form a tube for producing sealed packages starting from a sheet of packaging material having opening devices pre-applied thereon, the unit comprising:
 at least one guiding assembly configured to interact with the sheet of packaging material to fold it gradually into a tube shape;
 the guiding assembly comprising a plurality of folding rollers delimiting a passage for the sheet of packaging material and each having a lateral wall configured to cooperate in contact with the sheet of packaging material to control the folding thereof;
 the folding rollers comprising at least one folding roller having at least one recess on the lateral wall thereof, the recess defining a through slot passing through the lateral wall and configured to be engaged by the opening devices.

14. The unit as claimed in claim 13, wherein the at least one recess on the lateral wall of the at least one folding roller includes a plurality of circumferentially spaced-apart recesses each defining a through slot passing through the lateral wall and configured to be engaged by the opening devices.

15. A unit configured to form a tube for producing sealed packages starting from a sheet of packaging material having opening devices pre-applied thereon, the unit comprising:
 at least one guiding assembly configured to interact with the sheet of packaging material to fold it gradually into a tube shape;
 the guiding assembly comprising a plurality of rotatable folding rollers delimiting a passage for the sheet of packaging material and each having a lateral wall configured to cooperate in contact with the sheet of packaging material to control the folding thereof, each of the plurality of rotatable folding rollers having a maximum outer diameter;
 the plurality of rotatable folding rollers comprising at least one folding roller having at least one recess on the lateral wall thereof, the recess defining a slot configured to be engaged by the opening devices; and
 the maximum outer diameter of the at least one folding roller being greater than the maximum outer diameter of at least one other of the plurality of rotatable folding rollers.

16. The unit as claimed in claim 15, wherein the maximum outer diameter of the at least one folding roller is greater than the maximum outer diameter of all others of the plurality of rotatable folding rollers.

17. The unit as claimed in claim 15, wherein the lateral wall of each of the plurality of folding rollers has a concave-shaped outer surface, the recess being formed in the concave-shaped outer surface of the lateral-wall of the at least one folding roller.

18. A unit configured to form a tube for producing sealed packages starting from a sheet of packaging material having opening devices pre-applied thereon, the unit comprising:
 at least one guiding assembly configured to interact with the sheet of packaging material to fold it gradually into a tube shape;
 the guiding assembly comprising a plurality of folding rollers delimiting a passage for the sheet of packaging material and each having a lateral wall possessing an outer surface configured to cooperate in contact with the sheet of packaging material to control the folding thereof;
 the plurality of folding rollers comprising at least a first one of the folding rollers in which the lateral wall is configured differently relative to the lateral wall of at least a second one of the folding rollers, the lateral wall of the first one of the folding rollers being configured differently by having at least one recess that is recessed into the outer surface of the lateral wall of the first one of the folding rollers, the recess in the surface of the lateral wall defining a slot configured to be engaged by the opening devices.

19. The unit as claimed in claim 18, wherein the lateral wall of the first one of the folding rollers is configured differently relative to the lateral wall of all others of the plurality of folding rollers.

20. The unit as claimed in claim 18, wherein the lateral wall of each of the plurality of folding rollers is a concave-shaped lateral-wall, the recess being formed in the concave-shaped lateral-wall of the at least one folding roller.

\* \* \* \* \*